(12) United States Patent
Mori et al.

(10) Patent No.: US 6,274,277 B1
(45) Date of Patent: Aug. 14, 2001

(54) ORGANIC ELECTROLYTE BATTERY

(75) Inventors: Tatsuo Mori, Ibaraki; Tadayoshi Takahashi, Neyagawa; Shinichi Waki, Moriguchi; Nobuharu Koshiba, Ikoma-gun; Takashi Akiyama, Neyagawa, all of (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/357,225

(22) Filed: Jul. 20, 1999

(30) Foreign Application Priority Data

| Jul. 23, 1998 | (JP) | 10-207875 |
| Jul. 31, 1998 | (JP) | 10-217266 |
| Nov. 2, 1998 | (JP) | 10-311769 |
| Dec. 4, 1998 | (JP) | 10-345095 |

(51) Int. Cl.$^7$ .................................................... H01M 6/18
(52) U.S. Cl. .......................... 429/307; 429/324; 429/326; 429/336; 429/340
(58) Field of Search ................................. 429/324, 326, 429/336, 340

(56) References Cited

U.S. PATENT DOCUMENTS

| 4,223,078 | * | 9/1980 | Armand et al. ................ 429/194 |
| 4,546,057 | * | 10/1985 | Broussely et al. .............. 429/218 |
| 4,579,795 | * | 4/1986 | Gray ............................. 429/194 |
| 5,360,685 | * | 11/1994 | Tanaka .......................... 429/185 |
| 5,432,029 | * | 7/1995 | Mitate et al. ................... 429/194 |
| 5,691,083 | * | 11/1997 | Bolster .......................... 429/194 |
| 6,132,906 | * | 10/2000 | Nishimura et al. .............. 429/326 |

FOREIGN PATENT DOCUMENTS

529802 * 3/1993 (EP) .

* cited by examiner

*Primary Examiner*—Gabrielle Brouillette
*Assistant Examiner*—Dah-Wei D. Yuan
(74) *Attorney, Agent, or Firm*—Akin, Gump, Strauss, Hauer & Feld, L .L .P.

(57) ABSTRACT

The present invention relates to an organic electrolyte battery configured by sealing power generating elements comprising an organic electrolyte by a positive can, a negative can and a gasket, wherein said organic electrolyte includes a lithium salt containing a sulfonic acid group as a solute and at least one selected from a group consisting of sulfolane, 3-methyl sulfolane and Tetraglyme as a solvent. The aim of the invention is to provide an organic electrolyte battery having an excellent discharge performance in a low temperature environment and a superior reliability during long term storage, as well as a high temperature resistance which enables the battery to be mounted onto a substrate according to the Reflow method.

9 Claims, 1 Drawing Sheet

ORGANIC ELECTROLYTE BATTERY

BACKGROUND OF THE INVENTION

The present invention relates to a battery including an organic electrolyte (organic electrolyte battery) used for primary or memory back-up power sources of electronic appliances. More particularly, the present invention relates to a coin-shaped organic electrolyte battery with thermal resistance at a high temperature which can be mounted onto a circuit substrate by automatic soldering according to the Reflow method.

Organic electrolyte batteries generally have a high energy density so that it is possible to make the electronic appliances compact and light. Also, they have superior reliability in terms of storage characteristics and leakage resistance so that there is an increasing demand for them as primary and memory back-up power sources for various electronic appliances. Majority of this type of batteries are unchargeable primary batteries. Their representative experiment is batteries using metallic lithium as a negative electrode, and manganese dioxide, carbon fluoride, thionyl chloride, sulfur dioxide or silver chromate as a positive electrode.

Recently, rechargeable secondary batteries have been developed, and particularly, coin-shaped lithium secondary batteries using a lithium-aluminum alloy or the like have been in practical use for several years. Among these batteries, those using vanadium pentoxide or lithium manganate as a positive electrode are generally used.

A common organic electrolyte of such secondary batteries is one obtained by dissolving a lithium salt as a solute in a mixture solvent which contains a solvent having a high boiling point and a high dielectric constant and a solvent having a low boiling point and a low viscosity. For example, one or more solvents such as ethylene carbonate, propylene carbonate, butylene carbonate and γ-butylolactone are used as the solvent having a high boiling point and a high dielectric constant. The low-viscosity solvents mixed for reducing viscosity and thereby enhancing conductivity are intended to facilitate movement of lithium ions and ensure smooth discharge reaction of the batteries. For example, one or more solvents such as 1,2-dimethoxyethane, 1,2-diethoxyethane, tetrahydrofuran and 1,3-dioxorane are used for this purpose. As the solute, lithium salts such as $LiClO_4$, $LiBF_4$, $LiPF_6$ are generally known.

However, the batteries including the above-described organic electrolyte have various problems, if left under a high temperature. For example, the organic electrolyte evaporates at a high temperature in the battery to be obtained. Especially, the low boiling point solvents in the mixture solvent, which is retained in a separator, evaporate due to the boiling point of as low as around 100° C. Also, the above-mentioned lithium salts thermally decompose at a high temperature, thereby losing their function, since any of these lithium salts has a thermal decomposition temperature of around 100° C. This means occurrence of a trouble which promotes deterioration of battery performance. Therefore, the organic electrolyte batteries have a limit of the temperature at which they can be used, with their upper limit set at 60 to 85° C.

Under these circumstances, vigorous development is recently in progress on an extremely compact, coin-shaped secondary batteries having a diameter of not more than 6 mm to serve as memory back-up power sources for small-sized portable appliances. In order to mount such extremely compact batteries onto print substrates, there has been a proposed method for mounting lead terminals of the batteries by an automatic soldering using the Reflow method. According to this proposal, however, the internal temperature of the Reflow furnace becomes high, although for a short time, and reaches as high as 250° C. for dozens of seconds at the peak. Therefore, as described above, if the batteries of normal configuration are caused to pass the Reflow furnace, the oroganic electrolyte instantly vaporizes to raise internal pressure of the batteries, which may result in explosion of the batteries themselves.

In addition, it is also important whether each component of the organic electrolyte batteries has sufficient thermal resistance. Generally, a gasket insulating a positive can and a negative can (a seal plate) and a separator insulating a positive electrode and a negative electrode are made of polypropylene. Since thermosoftening temperature of polypropylene is 100 to 120° C., the gasket and the separator are damaged by heat, when they are exposed to a much higher temperature than the thermosoftening temperature in passing the Reflow furnace.

In order to solve the problems of the batteries induced by such high temperature environment, there has been another proposal of the organic electrolyte batteries wherein battery components are conferred thermal resistance (for example, Japanese Laid-open Patent Publication Hei 8-321287). The organic electrolyte batteries according to this proposal comprises an organic electrolyte obtained by dissolving a lithium salt as a solute in an organic solvent having a boiling point of not less than 170° C., a separator of porous synthetic resin sheet having a boiling point of not less than 170° C. and a gasket of thermoplastic synthetic resin which can be continuously used at least at 150° C.

More particularly, the proposed batteries use an organic electrolyte comprising lithium borofluoride dissolved as a solute in a solvent containing γ-butylolactone, a separator and a gasket made of heat resistant resin such as polyphenylene sulfide.

However, the proposed organic electrolyte batteries are intended to be used and stored in an environment of more than 150° C. for a long period, thereby not having enough thermal resistance to withstand the temperature of not less than 250° C. required for the Reflow method. Therefore, they also have the same problems as conventional other batteries such as the acute vaporization of the organic solvents, the decomposition of the solute and the damage of the gasket and the separator.

As described above, the currently available organic electrolyte batteries do not have enough thermal resistance to endure 250° C. of the Reflow furnace. As the result, the organic electrolyte batteries cannot yet be mounted onto a circuit substrate by the automatic soldering according to the Reflow method.

Therefore, the object of the present invention is to provide an organ ic electrolyte battery having a high thermal resistance at a high temperature that has never accomplished before by combining solvents with lithium salts, both having thermal resistance and reliability.

Further, the object of the present invention is to provide an organic electrolyte battery having an excellent thermal resistance that can endure the temperature of about 250° C. required for the automatic soldering according to the Reflow method, by employing highly heat resistant materials compatible with an organic electrolyte for battery components such as a gasket and a separator.

SUMMARY OF THE INVENTION

The present invention relates to an organic electrolyte battery configured by sealing power generating elements comprising a positive electrode, a negative electrode, a separator which isolates both electrodes and an organic electrolyte by a positive can to serve as a positive terminal, a negative can to serve as a negative terminal and a gasket. And, the organic electrolyte battery of the present invention is characterized in that the above-mentioned organic electrolyte includes a lithium salt containing a sulfonic acid group as the solute and at least one selected from a group consisting of sulfolane, 3-methyl sulfolane and Tetraglyme ($CH_3O(CH_2CH_2O)_4CH_3$; tetraethyleneglycol dimethylether) as the solvent.

It is preferable that said lithium salt containing a sulfonic acid group is lithium trifluoromethanesulfonate or a lithium salt containing an imide bond in the molecule.

Also, it is preferable that said lithium salt containing an imide bond in the molecule is lithium bisperfluoromethyl sulfonyl imide or lithium bisperfluoroethyl sulfonyl imide.

Also, it is preferable that said gasket is made of polyphenylene sulfide and that the above-mentioned separator is made of polyphenylene sulfide or cellulose.

Also, it is preferable that a sealant made of at least one selected from a. group consisting of isobutylene-isoprene rubber, styrene-butadiene rubber and fluorocarbon resin of which a part of the side chains is substituted with a silicon resin is disposed at a portion where the above-mentioned gasket is in contact with the above-mentioned positive can and negative can.

The above organic electrolyte battery can be applied to both primary and secondary battery.

DETAILED DESCRIPTION OF THE INVENTION

Figure 1:
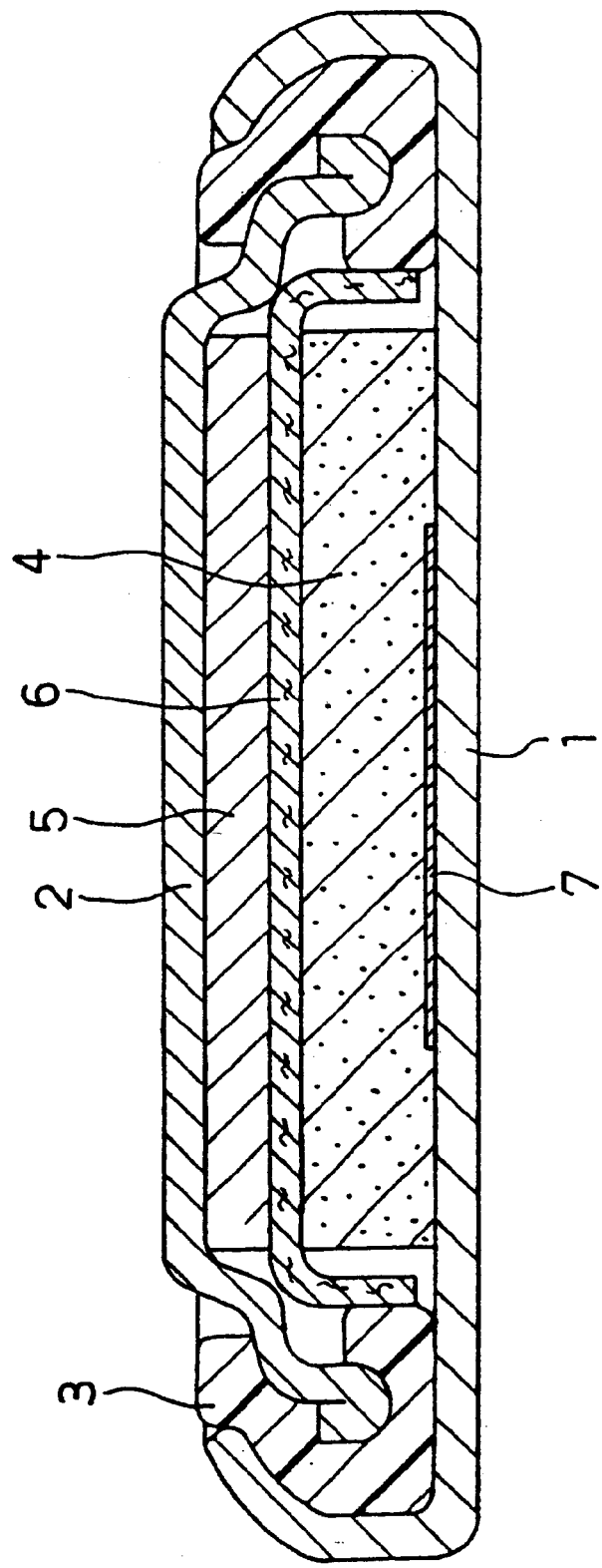
FIG. 1 is a longitudinal cross-sectional view of the organic electrolyte battery produced in examples.

In order to solve the above problems, the present invention provides an organic electrolyte battery which is configured by sealing power generating elements by a positive can, a negative can and a gasket, wherein the organic electrolyte includes a lithium salt containing a sulfonic acid group as the solute and at least one selected from a group consisting of sulfolane, 3-methyl sulfolane and Tetraglyme as the solvent.

First, explanation will be given for the solute of the present invention. For the organic electrolyte used in the present invention, a lithium salt containing a sulfonic acid group is used as the solute. It is considered that the lithium salt which may be exposed to a high temperature is required to have the following two major properties.

The first property is thermal decomposition temperature of the lithium salt. Lithium perchlorate ($LiClO_4$), lithium hexafluorophosphate ($LiPF_6$) and the like, generally used as a lithium salt for the organic electrolyte battery, have a thermal decomposition temperature of around 100° C. Thus, if they are exposed to a high temperature of 250° C. even though for a moment, their function as a lithium salt is deteriorated or lost due to the thermal decomposition and abnormal battery reaction. Contrary to this, a lithium salt containing a sulfonic acid group in the structure is generally known to have a high thermal decomposition temperature. Especially, lithium bisperfluoromethyl sulfonyl imide (LiN($CF_3SO_2$)$_2$) or lithium bisperfluoroethyl sulfonyl imide (LiN($C_2F_5SO_2$)$_2$) has a thermal decomposition temperature remarkably higher than 200° C. and they are still stable even when left under the temperature of as high as 250° C. to develop a smooth battery reaction.

The second property is influence on conductivity of the electrolyte. The higher conductivity of the electrolyte is preferable, and such conductivity is one of the most important factors which enables the battery to discharge a large amount of electric current. It is common to add a low viscosity solvent such as diethylene carbonate, 1,2-dimethoxyethane or 1,2 diethoxyethane to the electrolyte, in order to reduce viscosity, enhance mobility of lithium ions and ensure smooth discharge reaction of the battery. However, these solvents lower the boiling point of the electrolyte itself due to their boiling point of as low as around 100° C., thereby not appropriate for the use as described above. Therefore, it is required to use a lithium salt exhibiting a high conductivity when dissolved.

On the other hand, particularly lithium bisperfluoromethyl sulfonyl imide or lithium bisperfluoroethyl sulfonyl imide has an imide bond in the molecular structure and mobility of their dissociation salts becomes high. Therefore, it is possible without the use of the low viscosity solvents to give conductivity to some extent and a smooth discharge reaction.

Also, in case a lithium-aluminum alloy is used for the negative electrode, if a lithium salt has an imide bond, it has been discovered that the high conductivity of the lithium salt facilitates lithium dispersion on a surface of the aluminum alloy during lithium electrical deposition to drastically improve charge/discharge cycle performance.

For the above-stated reasons, it is preferable for remarkably improving high thermal resistance at a high temperature of the organic electrolyte battery to be obtained, in the present invention, to use lithium trifluoromethanesulfonate ($LiCF_3SO_3$), or lithium bisperfluoromethyl sulfonyl imide or lithium bisperfluoroethyl sulfonyl imide having an imide bond in the molecule as a lithium salt containing a sulfonic acid group.

Next, explanation will be further given for the solvent of the organic electrolyte of the present invention.

The solvent of the present invention contains at least one selected from the group consisting of sulfolane, 3-methyl sulfolane and Tetraglyme as the main component.

(1) In Case Only Sulfolane is Used

Since the Reflow furnace becomes as high as 250° C., it is desirable that the boiling point of the solvent of the electrolyte is higher than 250° C. The boiling point of propylene carbonate or ethylene carbonate commonly used as the organic solvent is not more than 250° C. Thus, it is preferable to use a solvent containing sulfolane as the main component in the present invention. Sulfolane has a boiling point of about 280° C. which is higher than the temperature of the Reflow furnace. And sulfolane is relatively in a stable condition at 250° C., although it has the vapor pressure at 250° C. In addition, by dissolving the above-mentioned lithium salt containing a sulfonic acid group as a solute, the organic electrolyte including sulfolane has a further raised boiling point due to elevation of boiling point, thereby working effectively.

(2) In Case Only Tetraglyme is Used

Tetraglyme has a boiling point of 275° C., which is higher than the internal temperature of the Reflow furnace. Thus, in the temperature range of around 250° C., Tetraglyme is in a stable condition, though it has a rather high vapor pressure. Also, since the above-mentioned lithium salt is dissolved as a solute, the organic electrolyte of the present invention including Tetraglyme as the main component has a higher boiling point than that of Tetraglyme itself due to elevation of molar boiling point, thereby working effectively in the high temperature environment. This organic electrolyte also has a favorable property in a low temperature environment in addition to the above-mentioned high temperature environment. One of the important requirements of the organic electrolyte battery is satisfactory discharge performance in the low temperature environment. Generally, solvents of high boiling point tend to have a high melting point and a high viscosity. Thus, such solvents make the conductivity of the electrolyte low in the low temperature range. If the temperature is lowered to −20° C., for example, lithium ions of the organic electrolyte are prevented from moving effectively so that little discharge capacity can be obtained. On the contrary, Tetraglyme has a low melting point of −30° C. although it has a high boiling point of 275° C., and is characterized by a wide temperature range of about 300° C. in which Tetraglyme remains in the state of solution. By using Tetraglyme as a solvent, the organic electrolyte can maintain the conductivity even under the environment of −20° C. Also, the use of Tetraglyme as a solvent makes it possible to facilitate the movement of the lithium ions during discharge reaction and maintain the discharge capacity in a wide temperature range.

(3) In Case Only 3-methyl Sulfolane is Used

The organic electrolyte including an organic solvent comprising mainly 3-methyl sulfolane is physically rather stable as a solvent at 250° C., which is the highest temperature of the Reflow furnace, although it has a vapor pressure at 250° C. This is because 3-methyl sulfolane has a boiling point of about 275° C. Also, this organic electrolyte dissolving the above-mentioned lithium salt as a solute has a much higher boiling point than the highest temperature of the Reflow furnace due to the elevation of molar boiling point. Therefore, this organic electrolyte functions effectively in the manufacturing environment exposed to the high temperature.

In addition to the safeguards against the high temperature atmosphere as described above, the organic electrolyte battery is required to have a satisfactory discharge performance at the temperature of not more than −20° C. However, solvents of high boiling point have a high melting point and thus make the conductivity of the obtained electrolyte low in the low temperature range. Therefore, lithium ions are unable to move effectively in the organic electrolyte in the low temperature environment of around −20° C. so that little discharge capacity can be obtained, actually. The 3-methyl sulfolane used in the present invention is characterized by the relatively low melting point of about 6° C. in spite of the high boiling point of about 275° C. Also, by dissolving the above-mentioned lithium salt in the solvent, the melting point of the electrolyte is lowered due to the depression of molar freezing point, which makes it possible to obtain an electrolyte having conductivity in the environment of −20° C. Therefore, the battery using this organic electrolyte enables the movement of lithium during discharge reaction to give a good discharge capacity in the temperature environment of not more than −20° C.

(4) In Case Sulfolane and 3-methyl Sulforane are Used

Sulfolane has a freezing point of 28° C. When the sulfolane is used as a solvent of the organic electrolyte, a lithium salt as the solute causes the depression of freezing point to lower the freezing temperature of sulfolane, thus enabling the use of this electrolyte in an ordinary temperature range. However, this organic electrolyte cannot be used at the temperature of not more than −20° C. Also, sulfolane has a relatively low conductivity in the low temperature range, which may lead to a large decline of discharge performance of the organic electrolyte battery.

On the other hand, 3-methyl sulfolane has a freezing point of 6° C. As described above, the depression of freezing point induced by the use of lithium salt contributes to the conductivity of the organic electrolyte even at the temperature of −20° C. Therefore, the low temperature property of sulfolane can be improved by mixing 3-methyl sulfolane having a superior low temperature property with sulfolane. The mixing ratio of 3-methyl sulfolane contained in a mixture solvent of sulfolane and 3-methyl sulfolane is preferably 10 to 90 vol %.

If the mixing ratio of 3-methyl sulfolnae is more than 20 volt %, effects of the depression of molar freezing point due to 3-methyl sulfolane are intensified.

Especially, if the mixing ratio of 3-methyl sulfolnae is more than 40 volt %, the effects of the depression of molar freezing point due to 3-metyl sulfolane are further intensified. In this case, it is possible to obtain a large discharge capacity in the temperature range of not more than −20° C. without deteriorating the high temperature property, compared to the case only 3-methyl sulfolane is used.

The organic electrolyte including the above-mentioned mixture solvent is less reactive to the positive electrode and the negative electrode and is hardly decomposed to evolve a gas, compared to the organic electrolyte including Tetraglyme, and has a superior long storage characteristic.

(5) In Case Sulfolane and Tetraglyme are Used

As described above, when sulfolane is used as the solvent of the organic electrolyte, the obtained electrolyte can be used in the ordinary temperature range by lowering of the freezing temperature of sulfolane. However, this organic electrolyte cannot be used at the temperature of not more than −20° C. Therefore, by using a mixture solvent of sulfolane and Tetraglyme, further improvement of the low temperature property can be realized.

When Tetraglyme is mixed with sulfolane, viscosity of the organic electrolyte is decreased to improve absorption of the electrolyte at the positive electrode, so that the low temperature property is improved. On the other hand, the boiling point of sulfolane is about 287° C. and the boiling point of Tetraglyme is about 275° C., so their boiling points are higher than the internal temperature of the Reflow furnace. Therefore, sulfolane and Tetraglyme have a stable property against the high temperature atmosphere during the passage of the Reflow furnace, so that the organic electrolyte using the mixture solvent does not decompose in the high temperature environment.

For example, the battery using the organic electrolyte with the mixing ratio of Tetraglyme at 5 vol % can maintain not less than 30% of the discharge capacity at 25° C. even in the environment of not more than −20° C. In addition, such battery never causes decline of the discharge performance.

Thus, the organic electrolyte including Tetraglyme mixed with sulfolane makes it possible to improve the discharge performance in the low temperature range which can be a problem when only sulfolane is used, even if the ratio of Tetraglyme contained in the solvent is small.

The mixing ratio of Tetraglyme contained in the mixture solvent of sulfolane and Tetraglyme is preferably 1 to 90 vol %. Particularly, the mixture solvent containing Tetraglyme in a range of 5 to 60 vol % provides an organic electrolyte battery having a superior long term reliability and an excellent discharge performance at a low temperature.

However, the ratio of Tetraglyme is more than 90 vol %, the self-discharging rate is increased, which influences the effects obtained by the use of Tetraglyme, i.e. the long term reliability. With regard to the thermal resistance at a high temperature, there is no difference observed between the organic solvent comprising only Tetraglyme or sulfolane and the mixture solvent including sulfolane and Tetraglyme.

(6) In Case 3-methl Sulfolane and Tetraglyme are Used 3-methyl sulfolane has a superior property in the low temperature environment as well as in the high temperature environment, therefore, it is a solvent appropriate for the use in a wide temperature range. However, viscosity of 3-methyl sulfolane in an ordinary temperature range is higher than that of sulfolane and Tetraglyme. Thus, the battery including only 3-methyl sulfolane as the solvent has an inferior discharge performance in the ordinary temperature range to the battery including sulfolane and Tetraglyme.

The viscosity of 3-methyl sulfolane is lowered by adding Tetraglyme thereto. Then, conductivity of the organic electrolyte using this mixture solvent is heightened, so that the discharge performance in the ordinary temperature range is improved. The improvement of the conductivity is also observed in the low temperature environment. And, with the depression of the freezing point induced by dissolving the solute into 3-methyl sulfolane, the discharge performance in the low temperature environment becomes more favorable. The mixing ratio of 3-methyl sulfolane contained in the mixture solvent of 3-methyl sulfolane and Tetraglyme is preferably in a range of 10 to 90 vol %.

(7) In Case Sulfolane, 3-methyl Sulfolane and Tetraglyme are Used

As described above, Sulfolane and 3-methyl sulfolane have a freezing point of 28° C. and 6° C. respectively. The organic electrolyte battery including only these two solvents may cause a deterioration of the discharge performance due to the low conductivity of the solvents in the low temperature range. However, if Tetraglyme is added to the mixture solvent of sulfolane and 3-methyl sulfolane, viscosity of the electrolyte is decreased to improve absorption of the electrolyte by the positive electrode, so that the low temperature property may be further improved.

The mixing ratio of Tetraglyme contained in the mixture solvent comprising sulfolane, 3-metyl sulfolane and Tetraglyme is preferably in a range of 1 to 90 vol %. Particularly, if the ratio of Tetraglyme is in a range of 5 to 60 vol %, it is possible to provide a battery with a long term reliability and a superior discharge performance at the low temperature. However, if the ratio of Tetraglyme is more than 90 vol %, the self-discharging rate is increased, influencing the effects obtained by the use of sulfolane and 3-methyl sulfolane, that is, the long term reliability. As per thermal resistance at a high temperature, there is no difference observed between the organic solvent comprising only Tetraglyme and the mixture solvent including sulfolane, 3-methyl sulfolane and Tetraglyme.

As described above, the solvent constituting the organic electrolyte of the present invention contains at least one selected from the group consisting of Tetraglyme, sulfolane and 3-methyl sulfolane as the main component. But the solvent of the present invention may contain other conventional solvents such as ethylene carbonate, propylene carbonate, butylene carbonate and γ-butylolactone in a range where the effects of the present invention are not deteriorated. The mixing ratio of these conventional solvents contained in the organic solvent of the present invention should be 0.1 to 30 vol %. Preferably, the ratio is 0.3 to 10 vol %.

Next, explanation will be given for the other battery components of the present invention.

The gasket also has a function as an insulating packing to insulate the positive can and the negative can and is fabricated by injection molding into a shape to fit an internal surface of the positive can. The separator is preferably made of nonwoven fabric of polyphenylene sulfide. Also, a paper separator of cellulose can be substituted for this separator.

Polyphenylene sulfide used for the separator and the gasket of the present invention has been selected from the viewpoint of stability against the electrolyte as well as thermal resistance. Polyphenylene sulfide has a thermosoftening temperature of not less than 200° C. and is free from heat distortion at the temperature of about 250° C., if a filler such as glass fiber is added. It is thus possible to maintain each function of the gasket and the separator in the high temperature environment of the Reflow furnace. Cellulose also has the same effects as described above.

Also, polyphenylene sulfide is not soluble in any of the solvents of Tetraglyme, sulfolane and 3-methyl sulfolane used for the organic electrolyte of the present invention, thus having a chemically stability. This stability of polyphenylene sulfide makes it possible to obtain a long term reliability.

Further, in the present invention, it is preferable that a sealant made of at least one selected from a group consisting of isobutylene-isoprene rubber, styrene-butadiene rubber and fluorocarbon resin of which a part of the side chains is substituted with a silicon resin is disposed at a portion where the above-mentioned gasket is in contact with the above-mentioned positive can and negative can.

Conventionally, pitch has been used as a sealant of the organic electrolyte battery. Pitch is inexpensive and effective in sealing, but lacks thermal resistance. Since pitch melts to liquid in the environment of about 250° C., sealing effects cannot be obtained. On the other hand, the above-mentioned gasket of the present invention has a high thermal resistance. Therefore, when the gasket is caused to pass the Reflow furnace, the gasket has little dimensional deformation due to heat so that excellent sealing effects can be maintained.

The sealant is required to have properties appropriate for the use as a sealant. As described above, the sealant is placed between the gasket and the positive/negative can. Between the gasket and the positive/negative can, exists an extremely small space. The size of such space is varied microscopically according to the condition of the surface of the positive/negative can and the gasket and is not uniform over the sealing portion of the battery case. The sealant is intended to seal or close the above-mentioned space, so it is required that the sealant is deformable according to the dimensional change of the space and is able to be firmly adhered to the positive/negative can and the gasket.

For such requirements of the sealant, Mooney viscosity and unsaturation ratio should be preferably applied to the evaluation criteria for the properties of isobutylene-isoprene rubber and styrene-butadiene rubber. Mooney viscosity is a fundamental figure of representing rubber strength. Mooney viscosity is the numerically represented resistance obtained when shearing force is applied at a certain temperature to a rubber between two discs. Meanwhile, the unsaturation ratio means a ratio of sites having a double bond in a molecular structure. As this value increases, adhesion property improves.

Another property required for the sealant is chemical stability against the organic electrolyte. The sealant is disposed on the surface of the gasket and is in contact with the organic electrolyte in the battery case. Therefore, the sealant is required to have the chemical stability which prevents the sealant from being decomposed by the organic electrolyte and giving adverse effects on the organic electrolyte, as well as the thermal resistance described above. The organic electrolyte of the present invention does not dissolve the above-mentioned sealant and the battery configured by using the above-mentioned electrolyte and the sealant causes no leakage.

As regards the sealant of the present invention, isobutylene-isoprene rubber is a copolymer of isobutylene and isoprene, and for example, the isobutylene-isoprene rubber represented by the chemical formula (1):

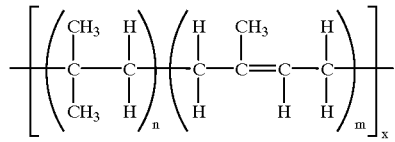

wherein m=3, n=97 may be used for the present invention. Especially, it is preferable in terms of mechanical properties to use the isobutylene-isoprene rubber having a Mooney viscosity at 100° C. of 20 to 100 and an unsaturation ratio of 0.1 to 5 mol %. Moreover, it is most appropriate to use the isobutylene-isoprene rubber having a Mooney viscosity of 30 to 80 and an unsaturation ratio of 0.5 to 3.5 mol %.

Also, as the styrene-butadiene rubber, the styrene-butadiene rubber, which is a copolymer of styrene and butadiene, may be represented by the chemical formula (2):

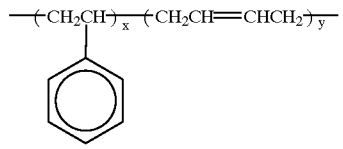

wherein x=1, y=6. Especially, it is preferable in terms of mechanical properties to use the styrene-butadiene rubber having a Mooney viscosity at 100° C. of 20 to 150 and an unsaturation ratio of 8 to 20 mol %. Moreover, it is most appropriate to use the styrene-butadiene rubber having a Mooney viscosity of 35 to 75 and an unsaturation ratio of 10 to 18 mol %. Also, weight ratio of styrene/butadiene constituting the styrene-butadiene rubber is preferably 20/80 to 35/65.

Further, as the fluorocarbon resin of which a part of the side chains is substituted with a silicon resin, for example, the fluorocarbon resin represented by the chemical formula (3):

may be used for the present invention.

Furthermore, as the fluorocarbon resin, for example, TFE-propylene of fluorocarbon resin represented by the chemical formula (4):

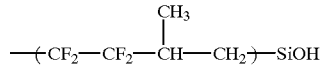

or VDF of fluorocarbon resin represented by the chemical formula (5):

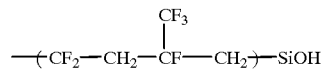

is preferably used for the present invention.

The sealant of the present invention, being dissolved in a volatile organic solvent, is applied to the gasket or the positive/negative can. The volatile organic solvents used for the present invention include volatile solvents of a low boiling point such as methylethyl ketone, xylene, chloroform, dichloroethane, dichloromethane, toluene, cyclohexane and petroleum ether. From these volatile solvents, an appropriate solvent can be selected according to the kind of the sealant used. Also, mixing ratio by weight of the above-mentioned sealant to the volatile organic solvent is 0.1/99.9 to 20/80, preferably 1/99 to 10/90.

As described above, the organic electrolyte battery in accordance with the present invention has succeeded in obtaining enough thermal resistance to withstand the high temperature of about 250° C. by combination of the power generating elements and the sealant having a high thermal resistance at a high temperature. Therefore, it is possible to mount the battery of the present invention onto a substrate by the automatic soldering according to the Reflow method.

EXAMPLES

Experiment 1

FIG. 1 shows a schematic longitudinal sectional view of an organic electrolyte battery fabricated for this experiment in accordance with the present invention. The battery has a diameter of 6.8 mm and a thickness of 2.1 m. For a positive can 1 to serve as a positive terminal and a negative can (occasionally referred to as "seal plate") 2 to serve as a negative terminal, stainless steel having a superior corrosion resistance was used. A gasket 3 insulating the positive can 1 and the negative can 2 was made of PPS. Pitch was applied to the surface of the gasket 3 which was in contact with the positive can and the negative can. The positive electrode 4 was prepared as follows. An active material lithium manganate was mixed with carbon black as a conductive agent and a powder of fluorocarbon resin as a binder, and the mixture was molded to a pellet of 4 mm in diameter and 1.2 mm in thickness, followed by drying at 250° C. for 12 hours. The negative electrode 5 was formed by punching out an aluminum-manganese alloy containing metallic manganese in a weight ratio of 5% into a disc of 4 mm in diameter and 0.3 mm in thickness and was provided inside of the negative can 2.

Also, in assembling the battery, a metallic lithium foil was pressurized and adhered onto the surface of the aluminum alloy, and lithium was then absorbed in the presence of an electrolyte into the aluminum alloy to electrochemically produce a lithium-aluminum alloy. This was used as the negative electrode. A carbon film 7 to serve as a current collector was formed on the middle of the inside of the positive can 1, and the positive electrode 4 and a separator 6 made of PPS nonwoven fabric were mounted on top of the carbon film. Then, after charging the electrolyte, the negative can 2 provided with the negative electrode 5 and the gasket 3 was jointed with the positive can 1, and the opening end of the positive can was fastened to the periphery of the gasket to seal the battery.

The electrolyte used for the battery of the above-described configuration included as a lithium salt lithium bisperfluoromethyl sulfonyl imide dissolved at a concentration of 1 mol/l in a mixture solvent containing sulfolane and propylene carbonate in a volumetric ratio of 5:1. This electrolyte of 15 μl was charged to the battery, which was named A-1.

Also, another battery named A-2 was produced in the same manner as the battery A-1 except for the use of lithium trifluoromethanesulfonate as a lithium salt.

For comparison, a battery A-3 was produced in the same manner as the battery A-1 except for the use of propylene carbonate as a solvent.

Also, for comparison, another battery A-4 was produced in the same manner as the battery A-1 except for the use of a mixture solvent containing sulfolane and 1,2-dimethoxy ethane in a volumetric ratio of 2:1

Further, for comparison, still another battery A-5 was produced in the same manner as the battery A-1 except for the use of lithium hexafluorophosphate as a lithium salt.

Furthermore, for comparison, another battery A-6 was produced in the same manner as the battery A-1 except for the use of lithium perchlorate as a lithium salt.

Next, a battery A-7 was produced in the same manner as the battery A-1 except for the use of a separator made of polypropylene nonwoven fabric.

Thereafter, a battery A-8 was produced in the same manner as the battery A-1 except for the use of a gasket made of polypropylene.

Finally, a battery A-9 was produced in the same manner as the battery A-1 except for the use of a solvent containing only sulfolane.

[Evaluation]

The initial internal resistance (Alternating current anodizing method; 1 kHz) of the batteries thus produced A-1 to A-9 was examined, then discharge capacity was measured at 20° C., with the load of 100 kΩ connected. The discharge capacity was obtained, based on the ratio against the theoretical capacity of lithium manganate which was defined as 100. Next, with a constant current of 0.1 mA, charge/discharge cycle test was performed by setting the upper limit of voltage at 3.25 V and the lower limit at 2.0 V, to obtain the maximum number of charge/discharge cycle.

Thereafter, each of the batteries was actually caused to pass a high frequency heating Reflow furnace to perform a Reflow furnace passage resistance test. The temperature profile of the Reflow furnace test comprised a preliminary heating process of 180° C. for 2 minutes, a heating process of 180° C. for 30 seconds, 245° C. for 30 seconds and 180° C. for 30 seconds and a natural cooling process to cool to room temperature. The batteries were caused to pass the furnace three times altogether, while being subjected to visual inspection and voltage examination. After that, the internal resistance of these batteries was measured again, and the value obtained was compared to the initial value to examine the degree of deterioration of the batteries. Table 1 shows the combination of battery constituting components and Table 2 lists the results of the test.

TABLE 1

|  | Solvent | Lithium salt | Separator | Gasket |
| --- | --- | --- | --- | --- |
| A-1 | Sulfolane Propylene carbonate | Lithium bisperfluoromethyl sulfonyl imide | PPS | PPS |
| A-2 | Sulfolane Propylene carbonate | Lithium trifluoromethanesulfonate | PPS | PPS |
| A-3 | Propylene carbonate | Lithium bisperfluoromethyl sulfonyl imide | PPS | PPS |
| A-4 | Sulfolane 1,2-dimethoxyethane | Lithium bisperfluoromethyl sulfonyl imide | PPS | PPS |
| A-5 | Sulfolane Propylene carbonate | Lithium hexafluorophosphate | PPS | PPS |
| A-6 | Sulfolane Propylene carbonate | Lithium perchlorate | PPS | PPS |
| A-7 | Sulfolane Propylene carbonate | Lithium bisperfluoromethyl sulfonyl imide | PP | PPS |
| A-8 | Sulfolane Propylene carbonate | Lithium bisperfluoromethyl sulfonyl imide | PPS | PP |
| A-9 | Sulfolane | Lithium bisperfluoromethyl sulfonyl imide | PPS | PPS |

TABLE 2

| Battery | Initial internal resistance (Ω) | Discharge capacity (%) | Charge/discharge cycle (times) | Condition after passage of the Reflow furnace | | | Internal resistance after the Reflow test (Ω) |
| --- | --- | --- | --- | --- | --- | --- | --- |
| | | | | First passage | Second passage | Third passage | |
| A-1 | 150 | 94 | 85 | Good | Good | Good | 156 |
| A-2 | 245 | 91 | 43 | Good | Good | Good | 255 |
| A-3 | 147 | 95 | 86 | Exploded | — | — | — |
| A-4 | 95 | 98 | 84 | Exploded | — | — | — |
| A-5 | 240 | 91 | 47 | Good | Good | Good | 2900 |
| A-6 | 654 | 62 | 35 | Good | Good | Good | 1200 |
| A-7 | 137 | 95 | 87 | Short-circuited | — | — | — |
| A-8 | 152 | 95 | 83 | Leaked | — | — | — |
| A-9 | 260 | 93 | 78 | Good | Good | Good | 265 |

According to Table 2, the battery A-1 of the present invention had discharge capacity of 94% of the theoretical value and showed no abnormality after the Reflow furnace passage test was performed three times. Also, the internal resistance remained almost unchanged even after the passage of the furnace. This means that the battery was free from thermal damage due to the passage of the Reflow furnace and gave a favorable result. The battery A-2 using lithium trifluoromethanesulfonate as a lithium salt showed neither abnormality nor trouble after the test was repeated three times and gave a favorable result in terms of electrical properties just like the result of the battery A-1. But the battery A-2 showed a little higher initial internal resistance than the battery A-1. The battery A-9 also showed a good condition after the passage of the furnace and had favorable electrical properties, although the battery had a little higher initial internal resistance just like the battery A-2.

On the other hand, the comparative battery A-3 using propylene carbonate as a solvent exploded, presumably because of the increased internal pressure caused by the boiling of the solvent during the passage of the Reflow furnace. Also, the comparative battery A-4 including 1,2-dimethoxy ethane, which had a low viscosity and a low boiling point, showed the least internal resistance, but exploded during the passage of the furnace, presumably because of the same reason as the battery A-3. The comparative battery A-5 including lithium hexafluorophosphate as a lithium salt and the battery A-6 including lithium perchlorate both showed an increased internal resistance. This is considered due to the increased electrolyte resistance induced by thermal decomposition of the lithium salt after the passage of the furnace. As a result, electrical properties of these batteries were destroyed as described.

Further, the battery A-7 using polypropylene as a material of a separator, was short-circuited internally because the separator melted and shrank during the passage of the furnace, bringing the negative electrode into contact with the positive electrode. The battery A-8 using polypropylene for a gasket produced a leakage from molten portions because of melting of the gasket during the passage of the furnace. As per the number of charge/discharge cycle, regardless of the type of the solvent, the electrolytes including lithium bisperfluoromethyl sulfonyl imide as a lithium salt gave favorable results with not less than 80 cycles of charge/discharge, compared to the electrolytes including other lithium salts. The reason is considered to be that lithium bisperfluoromethyl sulfonyl imide had a good effect on the form of lithium deposition on the surface of the lithium-aluminum alloy of the negative electrode.

As described above, the batteries in accordance with the present invention had excellent results in any of the discharge performance, the charge/discharge cycle performance and the high thermal resistance at a high temperature during the passage of the Reflow furnace. This is because of the thermal resistance of sulfolane which is the main component of the solvent of the electrolyte and the thermal resistance, the superior conductivity and the stability for the lithium-aluminum alloy negative electrode of lithium bisperfluoromethyl sulfonyl imide as a lithium salt. This is also because of the obtainment of the thermal resistance to withstand the high temperature of the Reflow furnace enabled by the use of polyphenylene sulfide for the battery components, gasket and the separator. Also, when lithium bisperfluoroethyl sulfonyl imide was used as a lithium salt, the similar results to the above could be obtained.

Experiment 2

Also hereinafter, the battery of the configuration described in FIG. 1 was produced.

The electrolyte used in this experiment included lithium bisperfluoromethyl sulfonyl imide dissolved in 3-methyl sulfolane at a concentration of 1 mol/l. Except for the use of this electrolyte of 15 μl, a battery B-1 was produced in the same manner as the battery A-1.

A battery B-2 was produced in the same manner as the battery B-1 except for the use of lithium bisperfluoroethyl sulfonyl imide as a lithium salt.

A battery B-3 was produced in the same manner as the battery B-1 except for the use of lithium trifluoromethanesulfonate as a lithium salt.

A battery B-4 was produced in the same manner as the battery B-1 except for the use of a mixture solvent containing 3-methyl sulfolane and sulfolane in a volumetric ratio of 2:1.

A battery B-5 was produced in the same manner as the battery B-1 except for the use of a separator made of cellulose.

A battery B-6 was produced in the same manner as the battery B-1 except for the use of propylene carbonate as the solvent.

A battery of B-7 was produced in the same manner as the battery B-1 except for the use of lithium hexafluorophosphate as a lithium salt.

A battery of B-8 was produced in the same manner as the battery B-1 except for the use of a separator made of polypropylene.

A battery of B-9 was produced in the same manner as the battery B-1 except for the use of a gasket made of polypropylene.

[Evaluation]

The batteries B-1 to B-9 thus produced were evaluated in the same manner as the Experiment 1, except that discharge capacity was measured at 20° C. with the load of 100 kΩ connected and measured at −20° C. with the load of 300 kΩ, and the discharge capacity was obtained.based on the ratio against the theoretical capacity of lithium manganate which was defined as 100. The batteries were caused to pass the Reflow furnace twice. Table 3 shows the combination of the battery constituting components. Table 4 lists the results.

TABLE 3

|   | Solvent | Lithium salt | Separator | Gasket |
|---|---|---|---|---|
| B-1 | 3-methyl sulfolane | Lithium bisperfluoromethyl sulfonyl imide | PPS | PPS |
| B-2 | 3-methyl sulfolane | Lithium bisperfluoroethyl sulfonyl imide | PPS | PPS |
| B-3 | 3-methyl sulfolane | Lithium trifluoromethanesulfonate | PPS | PPS |
| B-4 | 3-methyl sulfolane Sulfolane | Lithium bisperfluoromethyl sulfonyl imide | PPS | PPS |
| B-5 | 3-methyl sulfolane | Lithium bisperfluoromethyl sulfonyl imide | Cellulose | PPS |
| B-6 | Propylene carbonate | Lithium bisperfluoromethyl sulfonyl imide | PPS | PPS |

TABLE 3-continued

|  | Solvent | Lithium salt | Separator | Gasket |
|---|---|---|---|---|
| B-7 | 3-methyl sulfolane | Lithium hexafluorophosphate | PPS | PPS |
| B-8 | 3-methyl sulfolane | Lithium bisperfluoromethyl sulfonyl imide | PP | PPS |
| B-9 | 3-methyl sulfolane | Lithium bisperfluoromethyl sulfonyl imide | PPS | PP |

TABLE 4

| Battery | Initial internal resistance ($\Omega$) | Discharge Capacity (%) 20° C. | Discharge Capacity (%) −20° C. | Charge/discharge Cycle (times) | Condition after passage of the Reflow furnace First passage | Condition after passage of the Reflow furnace Second passage | Internal resistance after the Reflow test ($\Omega$) |
|---|---|---|---|---|---|---|---|
| B-1 | 160 | 94 | 68 | 85 | Good | Good | 172 |
| B-2 | 165 | 91 | 62 | 83 | Good | Good | 179 |
| B-3 | 256 | 82 | 43 | 56 | Good | Good | 282 |
| B-4 | 158 | 95 | 81 | 84 | Good | Good | 185 |
| B-5 | 152 | 94 | 69 | 80 | Good | Good | 169 |
| B-6 | 120 | 98 | 91 | 82 | Exploded | — | — |
| B-7 | 169 | 93 | 67 | 65 | Good | Good | 4990 |
| B-8 | 158 | 95 | 68 | 83 | Short-circuited | — | — |
| B-9 | 159 | 93 | 65 | 84 | Leaked | — | 8200 |

According to Table 4, the battery B-1 had discharge capacity of 94% of the theoretical value and showed no abnormality after the Reflow furnace passage test was performed twice. Also, the internal resistance remained almost unchanged even after the passage of the furnace. This means that the battery was free from thermal damage due to the passage of the Reflow furnace and was a favorable battery. The battery B-2 using lithium bisperfluoroethyl sulfonyl imide as a lithium salt produced the similar favorable result to the battery B-1.

The battery B-3 using lithium trifluoromethanesulfonate showed an increased initial internal resistance and a little shortened charge/discharge cycle life, compared to the battery B-1. However, this was not so bad as to cause a problem in practical use. The battery B-3 showed no abnormality after the Reflow test was done twice just like the result of the battery B-1, and gave a favorable result in the electrical properties. The battery B-4 using the mixture solvent containing 3-methyl sulfolane and sulfolane in a volumetric ratio of 2:1 also gave a favorable result in the electrical properties, the discharge performance and the condition after the passage of the Reflow furnace.

Also, the battery B-4 had 81% of the positive electrode discharge capacity at −20° C., the highest among the batteries, showing a favorable discharge performance. This is considered because the use of the mixture solvent lowered the freezing point of the electrolyte due to depression of the molar freezing point, elevated the conductivity of the electrolyte and facilitated the movement of the lithium ions in discharging.

The battery B-5 using the separator made of cellulose gave a favorable result just like the battery B-1 using the separator made of PPS nonwoven fabric.

The battery B-6 using propylene carbonate as a solvent exploded during the passage of the Reflow furnace, presumably due to the increased internal pressure induced by boiling of the solvent.

The Battery B-7 using lithium hexafluorophosphate as a lithium salt had an increased internal resistance. This is considered because of the increased electrolyte resistance induced by thermal decomposition of the lithium salt after the passage of the Reflow furnace. Thus, the electrical properties of this battery were deteriorated.

The Battery B-8 using the separator made of polypropylen was short-circuited internally because the separator melted and shrank during the passage of the furnace, bringing the negative electrode into contact with the positive electrode. Thus, the battery function was deteriorated.

The battery B-9 using the gasket made of polypropylen produced a leakage from molten portions because of melting of the gasket during the passage of the furnace.

As per the number of charge/discharge cycle, regardless of the type of the solvent, the electrolytes including lithium bisperfluoromethyl sulfonyl imide and lithium bisperfluoroethyl sulfonyl imide as a lithium salt gave favorable results with not less than 80 cycles of charge/discharge, compared to the electrolytes including other lithium salts. This is considered because lithium bisperfluoromethyl sulfonyl imide and lithium bisperfluoroethyl sulfonyl imide had a good effect on the form of lithium deposition on the surface of the lithium-aluminum alloy of the negative electrode.

As described above, it was confirmed that the batteries in accordance with the present invention had excellent results in any of the discharge performance, the charge/discharge cycle performance and the high temperature resistance during the passage of the Reflow furnace. This is because of the thermal resistance of 3-methyl sulfolane which is the main component of the solvent of the electrolyte and the thermal resistance, the superior conductivity and the stability for the lithium-aluminum alloy negative electrode of lithium salts. This is also because of the obtainment of the thermal resistance to withstand the high temperature of the Reflow furnace enabled by the use of the gasket made of PPS, as well as the separator made of PPS nonwoven fabric or cellulose, as the battery component.

Also, the use of the mixture solvent containing 3-methyl sulfolane and sulfolane as the solvent enabled the batteries to obtain a further superior low temperature discharge performance.

Experiment 3

Also in this experiment, the battery of the configuration described in FIG. 1 was produced.

The electrolyte used in this experiment included lithium bisperfluoromethyl sulfonyl imide of a solute dissolved in Tetraglyme as a solvent at a concentration of 1 mol/l. Except that this electrolyte of 15 µl was charged to a battery case comprising the positive can 1, the negative can 2 and the gasket 3, in the same manner as the battery A-1, a battery C-1 was produced.

A battery C-2 was produced in the same manner as the battery C-1 except for the use of lithium trifluoromethansulfonate as a lithium salt.

A battery C-3 was produced in the same manner as the battery C-1 except for the use of a mixture solvent containing Tetraglyme and sulfolane in a volumetric ratio of 6:4.

Also, a battery C-3' was produced in the same manner as the battery C-1 except for the use of a mixture solvent containing Tetraglyme and 3-methyl sulfolane in a volumetric ratio of 6:4.

A battery C-4 was produced in the same manner as the battery C-1 except for the use of a mixture solvent containing Tetraglyme, 3-methyl sulfolane and sulfolane in a volumetric ratio of 3:1:1.

A battery C-5 was produced in the same manner as the battery C-1 except for the use of a separator made of cellulose.

For comparison, a battery C-6 was produced in the same manner as the battery C-1 except for the use of propylene carbonate as a solvent.

A battery C-7 was produced in the same manner as the battery C-1 except for the use of lithium hexafluorophosphate as a lithium salt.

A battery C-8 was produced in the same manner as the battery C-1 except for the use of a separator made of polypropylene.

A battery C-9 was produced in the same manner as the battery C-1 except for the use of a gasket made of polypropylene.

[Evaluation]

The batteries thus obtained, C-1 to C-9, were evaluated in the same manner as the Experiment 1 with the following exceptions. The discharge capacity was measured at 20° C. with the load of 100 kΩ connected and with a constant current of 0.1 mA, charge/discharge cycle test was performed by setting the upper limit of voltage at 3.25 V and the lower limit at 2.0 V, to obtain maximum number of charge/discharge cycle. The discharge capacities were based on the ratio against the theoretical capacity of lithium manganate which was defined as 100. Table 5 shows the combination of the battery components and Table 6 shows the results.

TABLE 5

|  | Solvent | Lithium salt | Separator | Gasket |
| --- | --- | --- | --- | --- |
| C-1 | Tetraglyme | Lithium bisperfluoromethyl sulfonyl imide | PPS | PPS |
| C-2 | Tetraglyme | Lithium trifluoromethanesulfonate | PPS | PPS |
| C-3 | Tetraglyme Sulfolane | Lithium bisperfluoromethyl sulfonyl imide | PPS | PPS |
| C-3' | Tetraglyme 3-methyl sulfolan | Lithium bisperfluoromethyl sulfonyl imide | PPS | PPS |
| C-4 | Tetraglyme 3-methyl sulfolan Sulfolane | Lithium bisperfluoromethyl sulfonyl imide | PPS | PPS |
| C-5 | Tetraglym | Lithium bisperfluoromethyl sulfonyl imide | Cellulose | PPS |
| C-6 | Propylene carbonate | Lithium bisperfluoromethyl sulfonyl imide | PPS | PPS |
| C-7 | Tetraglym | Lithium hexafluorophosphate | PPS | PPS |
| C-8 | Tetraglym | Lithium bisperfluoromethyl sulfonyl imide | PP | PPS |
| C-9 | Tetraglym | Lithium bisperfluoromethyl sulfonyl imide | PPS | PP |

TABLE 6

| Battery | Initial internal resistance (Ω) | Discharge capacity (%) | Charge/discharge cycle (times) | Condition after passage of the Reflow furnace | | | Internal resistance after the Reflow test (Ω) |
| --- | --- | --- | --- | --- | --- | --- | --- |
| | | | | First passage | Second passage | Third passage | |
| C-1 | 180 | 93 | 88 | Good | Good | Good | 175 |
| C-2 | 205 | 85 | 75 | Good | Good | Good | 185 |
| C-3 | 223 | 92 | 90 | Good | Good | Good | 220 |
| C-3' | 290 | 89 | 70 | Good | Good | Good | 330 |
| C-4 | 247 | 94 | 93 | Good | Good | Good | 243 |
| C-5 | 214 | 93 | 86 | Good | Good | Good | 217 |
| C-6 | 100 | 100 | 100 | Exploded | — | — | — |
| C-7 | 145 | 92 | 64 | Good | Good | Good | 1450 |
| C-8 | 198 | 93 | 48 | Short-circuited | — | — | — |
| C-9 | 175 | 93 | 88 | Leaked | — | — | — |

According to Table 6, the battery C-1 had discharge capacity of 93% of the theoretical value and showed no abnormality after the Reflow furnace passage test was repeated three times. Also, the internal resistance remained almost unchanged even after the passage of the furnace. This means that the battery was free from thermal damage due to the passage of the Reflow furnace and produced a favorable result. The battery C-2 using lithium trifluoromethane-sulfonate as a lithium salt had a higher initial internal resistance value than that of the battery C-1. However, the battery C-2 showed no abnormality after the Reflow test was repeated three times just like the battery C-1 and gave a favorable result of the electrical properties.

The battery C-3 and C-3' had a high initial internal resistance, because the use of the mixture solvent containing sulfolane or 3-methyl sulfolane in a volumetric ratio of 40% lead to an increase in electrolyte viscosity. However, the battery C-3 and C-3' gave a favorable result in terms of the charge/discharge viscosity, compared to the battery C-1, and also showed no abnormality in the Reflow furnace passage test. The battery C-4 to which sulfolane and 3-methyl sulfolane were further added showed a further improved result in terms of the electrical properties compared to the battery C-3, because the amount of Tetraglyme contained in the electrolyte was decreased.

The battery C-5 had a high initial internal resistance compared to the battery C-1, but except this, gave a favorable result.

Contrary to these results, the battery C-6 exploded, because propylene carbonate used as a solvent boiled, thereby inducing the increased pressure. Also, the battery C-7 had an increased internal resistance of the electrolyte, because lithium hexafluorophosphate used as a lithium salt was thermally decomposed during the passage of the furnace. This means the increased internal resistance and shows that the electrical properties of the battery were destroyed.

The battery C-8 showed shrinkage of the separator and was short-circuited internally. This is because polypropylene used for the separator was exposed to a temperature higher than the melting temperature during the passage of the furnace and thereby the separator melted and shrank, bringing the negative electrode into contact with the positive electrode. The battery C-9 showed a leakage from the gasket made of polypropylene. This is because the gasket shrank and melted due to the same phenomenon as the battery C-8, thus causing the leakage from the molten portion of the gasket.

As per the number of charge/discharge cycle, regardless of the type of the solvent, the batteries including lithium bisperfluoromethyl sulfonyl imide as a solute gave favorable results with batteries not less than 80 cycles of charge/discharge, compared to the batteries including other lithium salts. This is considered because lithium bisperfluoromethyl sulfonyl imide had a good effect on the form of lithium deposition on the surface of the lithium-aluminum alloy of the negative electrode.

As described above, it was confirmed that the batteries in accordance with the present invention had excellent results in any of the discharge performance, the charge/discharge cycle performance and the high temperature resistance during the passage of the Reflow furnace. This is because of the thermal resistance of Tetraglyme which is the main component of the solvent of the electrolyte and the thermal resistance, the conductivity and the stability for the lithium-aluminum alloy negative electrode of lithium bisperfluoromethyl sulfonyl imide of the solute. The similar results could be obtained when lithium bisperfluoroethyl sulfonyl imide was used as a solute.

Further, the use of polyphenylene sulfide for the separator and the gasket makes it possible to obtain the stability against the above-mentioned organic electrolyte as well as the thermal resistance during the passage of the Reflow furnace.

Experiment 4

Batteries C-10 to C-16 were produced in the same manner as the battery C-1, except for the use of a mixture solvent containing Tetraglyme and sulfolane in the mixing ratio shown in Table 7. For these batteries, lithium manganate was used for the positive electrode, a lithium-aluminum alloy for the negative electrode and polyphenylene sulfide for a gasket and a separator.

The Reflow furnace passage test was performed by causing the batteries to pass the inside of the high frequency heating Reflow furnace, to examine high temperature resistance of the batteries C-10 to C-16. For this test, the batteries were caused to pass the furnace twice in the same temperature profile as that of the Experiment 1. After the test, occurrence of explosion and leakage was observed by visual inspection, but any of the batteries C-10 to C-16 produced neither leakage nor explosion.

Subsequently, using the batteries having been subjected to the Reflow furnace test, discharge test was conducted with these batteries connected to resistance of 300 k$\Omega$ under an environment of $-20°$ C. Also, using the batteries having been subjected to the Reflow test, after they were stood in a thermostat of 60° C. for 100 days, another discharge test was conducted with these batteries connected to resistance of 51 k$\Omega$ at room temperature. Based on the measurements of discharge capacity obtained by these discharge tests, the ratio against the theoretical capacity was obtained in the same manner as the Experiment 3. Table 7 shows the results. Further, self-discharging rate was obtained based on the discharge capacity before and after the storage of 100 days. Table 7 also shows this result.

TABLE 7

| Battery C | Composition of a mixture solvent (vol %) | | Evaluation results | | |
|---|---|---|---|---|---|
| | Tetraglyme | Sulfolane | Discharge capacity (%) | Remaining capacity (%) | Self-discharging rate (%) |
| 10 | — | 100 | 0.1 | 95 | 5 |
| 11 | 1 | 99 | 10 | 92 | 8 |
| 12 | 5 | 95 | 31 | 90 | 10 |
| 13 | 60 | 40 | 55 | 88 | 12 |
| 14 | 90 | 10 | 60 | 83 | 17 |
| 15 | 92 | 8 | 62 | 70 | 30 |
| 16 | 100 | — | 70 | 59 | 41 |

According to Table 7, the battery C-10 using only sulfolane as a solvent hardly discharged in the environment of $-20°$ C. This is considered because the electrolyte itself froze. On the other hand, as per the batteries C-11 to C-16 containing Tetraglyme, the discharge capacity in the low temperature environment increased, as the ratio of Tetraglyme contained in a solvent increased. Especially, the battery C-1 using only Tetraglyme as a solvent showed the most favorable result in terms of the discharge capacity in this environment. From these, it has been discovered that when sulfolane is only used as a solvent of an electrolyte, the electrolyte freezes at −20° C., but that if Tetraglyme is added to the solvent, the electrolyte of such solvent does not freeze so that discharging in the low temperature environment is possible. In this case, Tetraglyme is also considered to have an effect of improving the conductivity of the electrolyte itself.

On the other hand, from the viewpoint of the reliability in long term storage, the battery C-10 using only sulfolane is preferable. The battery C-16 using the solvent comprising onlly Tetraglyme showed a high self-discharging rate of not less than 40%. The increasing rate of the self-discharging rate changed at 90% of the volumetric ratio of Tetraglyme contained in a solvent, and the self-discharging rate of the batteries of C-15 and C-16 containing Tetraglyme in a higher ratio than 90% sharply multiplied. On the contrary, regarding the batteries C-10 to C-14 containing Tetraglyme in a volumetric ratio of not more than 90%, the self-discharging rate decreased, as the ratio of sulfolane increased. Especially, the battery C-10 using only sulfolane as a solvent showed a low self-discharging rate of 5%, having an excellent reliability in long term storage. Therefore, it can be concluded that the battery containing sulfolane mainly as a solvent has a small self-discharging rate compared to the battery containing Tetraglyme mainly.

From the viewpoint of the battery performance required for the organic electrolyte battery such as discharge performance in a low temperature environment and reliability in long term storage, the mixture solvent of sulfolane and 3-methyl sulfolane is preferable to the solvent containing Tetraglyme. Particularly, the mixture solvent containing Tetraglyme in a mixing ratio of not more than 90% as well as sulfolane and 3-methyl sulfolane is preferable in terms of the battery performance.

Also, the batteries which needs reliability in long term storage more than discharge performance in a low temperature environment, for example, the batteries to be used in a room temperature environment mainly for memory back-up power source of various appliances, should preferably contain Tetraglyme in a solvent in a ratio of 5 to 60%.

In this experiment, the use of the solvent containing 3-methyl sulfolane as well as Tetraglyme also made it possible to obtain the battery having both discharge performance in the low temperature environment and reliability during long term storage.

Experiment 5

In this experiment, a coin-shaped organic electrolyte battery of the configuration described in FIG. 1 was produced. A positive can 1 of stainless steel was combined with a negative can (or a seal plate) 2 so as to form a battery case of 6.8 mm in diameter and 2.1 mm in thickness. PPS was used for a gasket 3 to be inserted between the positive can 1 and the negative can 2. Isobutylene-isoprene rubber diluted with toluene was used for a sealant (not illustrated in FIG. 1) to be placed between the gasket 3 and the positive can 1 and between the negative can 2 and the gasket 3, and was applied to the gasket, which was then placed at a predetermined position.

A positive electrode 4 was prepared as follows. An active material lithium manganate was mixed with carbon black as a conductive agent and a powder of fluorocarbon resin as a binder, and the mixture was molded to a pellet of 4 mm in diameter and 1.2 mm in thickness, followed by drying at 250° C. for 12 hours. The pellet-shaped positive material thus obtained was mounted onto a positive current collector 7 formed by applying carbon paint on the internal surface of the positive can 1.

Meanwhile, a negative electrode 5 was produced as follows. An aluminum-manganese alloy containing manganese in a weight ratio of 5% was punched out into a disc of 4 mm in diameter and 0.3 mm in thickness and the disc of the alloy was provided inside of the positive can 2.

Also, in assembling the battery, a metallic lithium foil was pressurized and adhered onto the aluminum alloy, and lithium was then absorbed in the presence of an electrolyte into the aluminum alloy to electrochemically produce a lithium-aluminum alloy. The alloy thus obtained was used as the negative electrode 5.

For a separator 6 to be placed between the positive electrode 4 and the negative electrode 5, PPS was used just like the gasket. For an electrolyte, a lithium salt was dissolved as a solute in sulfolane of an organic solvent. The electrolyte of 10 $\mu$l was charged to a battery case. The battery thus obtained was named D-1 of this experiment.

A battery D-2 was produced in the same manner as the battery D-1, except that styrene-butadiene rubber diluted with toluene (toluene:sealant=95:5 (by weight)) was applied to the gasket 3 as a sealant.

A battery D-3 was produced in the same manner as the battery D-1, except that fluorocarbon resin of which a part of the side chains is substituted with a silicon resin, diluted with toluene, was applied to the gasket 3 as a sealant and was dried at 160° C. for four hours.

For comparison, a battery D-4 was produced in the same manner as the battery D-1, except that pitch was applied to the gasket 3 as a sealant.

[Evaluation]

The batteries thus obtained D-1 to D-4 were caused to pass the high frequency heating Reflow furnace in the same manner as the Experiment 1 to perform a high temperature environment resistance test.

In this experiment, however, 50 batteries per each battery D-1 to D-4 were observed beforehand to confirm that they had no leakage, then were caused to pass the Reflow furnace to examine occurrence of the leakage. The batteries which had no leakage then were again caused to pass the furnace to examine the occurrence. Table 8 lists the results.

TABLE 8

| Battery | Kind of sealant | Leakage occurrence ratio after Passage of the Reflow furnace (%) | |
| --- | --- | --- | --- |
| | | First passage | Second Passage |
| D-1 | Isobutylene-isoprene rubber (Mooney viscosity 40 Unsaturation ratio 3 mol %) | 0 | 6 |
| D-2 | Styrene-butadiene rubber (Mooney viscosity 50 Unsaturation ratio 15 mol % Styrene:Butadiene = 25:75 (by weight) | 0 | 2 |
| D-3 | VDF of fluorocarbon resin of which a part of the side chains is substituted with a silicone resin | 2 | 4 |
| D-4 | Pitch | 100 | — |

According to Table 8, the batteries in accordance with the present invention have an excellent leakage resistance after the passage of the Reflow furnace compared to the battery D-4 using pitch as a sealant. From the above, this test has given a result that any of the batteries D-1, D-2 and D-3 of the present invention hardly caused leakage and thus has an excellent leakage resistance after the passage of the Reflow furnace. This is because isobutylene-isoprene rubber, styrene-butadiene rubber and fluorocarbon resin of which a part of the side chains is substituted with a silicon resin, which were used for the sealant, had thermal resistance so that thermosoftening was not caused.

In this experiment, sulfolane was used as the solvent of the organic electrolyte, however, the similar effects can also be obtained if 3-methyl sulfolane or Tetraglyme is used.

INDUSTRIAL APPLICABILITY

The present invention can provide an organic electrolyte battery having an excellent discharge performance in a low temperature environment and a superior reliability during long term storage, as well as a high temperature resistance which enables the battery to be mounted onto a substrate according to the Reflow method.

Furthermore, the present invention also has an effect of simplifying the manufacturing process of small-sized portable appliances for which the battery of this kind are used, because the invention enables the mounting of the battery onto a substrate by the automatic soldering.

What is claimed is:

1. An organic electrolyte battery configured by sealing power generating elements comprising an organic electrolyte by a positive can, a negative can and a gasket, wherein said organic electrolyte includes a lithium salt containing a sulfonic acid group as a solute and at least one selected from a group consisting of sulfolane, 3-methyl sulfolane and tetraglyme as a solvent, wherein said lithium salt containing a sulfonic acid group is a lithium salt containing an imide bond in the molecule.

2. An organic electrolyte battery configured by sealing power generating elements comprising an organic electrolyte by a positive can, a negative can and a gasket, wherein said organic electrolyte includes a lithium salt containing a sulfonic acid group as a solute and tetraglyme as a solvent, wherein said lithium salt containing a sulfonic acid group is lithium trifluoromethane sulfonate.

3. The organic electrolyte battery in accordance with claim 1, wherein said lithium salt containing an imide bond in the molecule is lithium bisperfluoromethyl sulfonyl imide or lithium bisperfluoroethyl sulfonyl imide.

4. The organic electrolyte battery in accordance with claim 1, wherein said gasket is made of polyphenylene sulfide.

5. The organic electrolyte battery in accordance with claim 1, further comprising a separator, wherein said separator is made of polyphenylene sulfide or cellulose.

6. The organic electrolyte battery in accordance with claim 1, wherein a sealant made of at least one selected from a group consisting of isobutylene-isoprene rubber, styrene-butadiene rubber and fluorocarbon resin of which a part of the side chains is substituted with a silicon resin is disposed at a portion where said gasket is in contact with said positive can and said negative can.

7. The organic electrolyte battery in accordance with claim 2, wherein said gasket is made of polyphenylene sulfide.

8. The organic electrolyte battery in accordance with claim 2, further comprising a separator, wherein said separator is made of polyphenylene sulfide or cellulose.

9. The organic electrolyte battery in accordance with claim 2, wherein a sealant made of at least one selected from a group consisting of isobutylene-isoprene rubber, styrene-butadiene rubber and fluorocarbon resin of which a part of the side chains is substituted with a silicon resin is disposed at a portion where said gasket is in contact with said positive can and said negative can.

* * * * *